Patented May 11, 1926.

UNITED STATES PATENT OFFICE.

PAUL W. KRUGER, OF BOYETT, MISSISSIPPI.

DENTAL FILLING MATERIAL.

No Drawing.　　Application filed June 19, 1924. Serial No. 721,139.

This application is a continuation in part of my application filed July 22nd, 1921, Ser. No. 486,809, "compositions of matter for preserving alive pulps in teeth, and dental filling materials". In investigating magnesium cement powders which would set with organic germicidal liquids and substances appropriate for dental uses, I have made many hundreds of experiments. Results of my experimental work exist disclosed in said application filed July 22, 1921, in specification and claims, as evidence of my inventions in regard to eugenol and guaiacol as setting liquids of dental cements. My disclosures in regard to eugenol as a germicidal liquid and as a setting liquid of magnesium cement powders, magnesium oxide cement powders and magnesium oxychloride cement powders, as set with eugenol alone and as a setting liquid in conjunction with other suitable liquid, are made the subject of this application.

My invention relates to germicidal cements and particularly to germicidal magnesium cements and is new in the use of eugenol as a setting fluid of magnesium cement powders.

The object of my invention is to provide germicidal cements appropriate for dental uses and for proximity to live tooth pulp, by the use of eugenol as a germicidal property contributing liquid while being at the same time a setting liquid of the magnesium cement powders. My invention avoids the use of phosphoric acids or other non-germicidal setting fluids which do not enhance or contribute to germicidal effect in themselves.

My cement is described and is of a type as follows:

A cement to set and harden consists of a powder and a liquid or combination of two substances which, brought together, set into a hardened or firm mass. Either guaiacol or eugenol in contact with magnesium oxide will harden into a solid mass and will also combine with magnesium oxychloride as well as with magnesium oxide or with a combination of these and harden with greater rapidity, or with magnesium oxychloride cement powders.

The magnesium oxide though of great insolubility yet has a very decided alkaline reaction or alkaline reaction in the hydrated form. A cement paste made by mixing guaiacol or eugenol with the pure or concentrated magnesium oxide powder to form a paste of suitable consistency to apply in dental use or on a tooth pulp will not contain sufficient liquid to neutralize the alkalinity of the cement. The amount of these liquids in a pasty or creamy mixture is sufficient to neutralize only a small percentage of the magnesium oxide. Eugenol acts in a manner similar to a weak acid as it has in its composition and extended formula of considerable molecular weight, one atom of hydrogen that may be displaced and it will neutralize only a correspondingly small amount of magnesium oxide.

It is not necessary that the cement be constituted entirely of a material with which the setting liquid may chemically unite. I find it also of advantage to incorporate an inert or insoluble material, or substances suitable for dental fillings, as a foundation with which to incorporate the cement materials to act as a binder, using no more of the cementing ingredients than is necessary to fill the interstices of the material or more than coat the material sufficiently for firmly setting and solidly binding. A cement powder mainly composed of an inert material such as kaolin, fuller's earth, infusorial earth or other suitable, inert or insoluble substance, or other suitable powders or suitable substances appropriate for dental uses, will require just as much guaiacol or eugenol, (approximately) to be mixed with it for a workable cement paste but the magnesium oxide present in smaller quantity will be neutralized and combined to a greater extent as the liquid cannot combine with the inert or insoluble substance, and is taken up in combination with magnesium oxide.

By the word "inert" in this specification is meant chemically inert in reference to the ingredients of the cement. Restrictions are not made as to inert in a physiological sense as any substances appropriate for dental uses, that conform to the definition of the word "inert" as set forth and herein reiterated, may be used in place of some of the cementitious solid ingredient or MgO, to the extent of avoiding needless excess of chemically uncombined cementitious solid ingredient or MgO, in the hardened set cement. Substances that do not withstand a heat of flame such as required in calcining magnesium compounds, I mix directly in cold mixture with the cement binding powder. Such substances I use in mixture direct, such as guaiacol benzoate, iodochloroxyquinoline, helenin or other essentially chemically inert suitable organic substances suitable for dental uses. Appropriate inorganic substances that are readily changed by heat must be likewise incorporated in mixture without heat by working together the cement binding powder and the inert substances as defined.

I find by experimental trials that to make a cement of firmness and hardness and some rapidity of setting, there must be sufficient magnesium oxide incorporated to make a binding material approximately sufficient to fill the interstices of the inert powder. Even this quantity of magnesium oxide brought into a creamy or plastic consistency in mixture with the setting liquid is more than can be entirely neutralized by either guaiacol or eugenol or a combination of both used as the cement liquid. This alkalinity can be further reduced but not obliterated by using in part an oxychloride of magnesia in place of magnesium oxide or a mixture or combination of magnesium oxide and oxychloride which enhances the speed of setting.

When hardness is particularly desired in the set cement and a calcining temperature of magnesium cements is permitted I use an inert or insoluble ingredient which will appropriately withstand heat. In such case, for the inert substance I use by choice kaolin as a soft, white, inert, insoluble material permanently tolerated directly on the tissue. To use a magnesium salt or magnesium oxide in mixture with this does not produce as firm a cement or quick setting cement as direct attachment of the magnesium compound or magnesium salt to the kaolin particles. For a harder cement I calcine the oxide directly on the kaolin from the soluble salt of magnesium or produce the oxychloride of magnesium directly deposited on the particles of kaolin by calcining the magnesium chloride into the oxide and magnesium chloride combined form, or oxychloride form, or by a combination of these methods any of which will produce a better and firmer cement than a mixture. Other suitable magnesium salts may be calcined together with the kaolin or inert or insoluble substance, or a soluble and insoluble salt of magnesium with the kaolin such as magnesium chloride and magnesium carbonate.

The kaolin I mix with a solution in water of magnesium chloride or with a solution of a soluble magnesium salt which will form the oxide in calcining or with an insoluble magnesium salt mixed with a soluble magnesium salt, or mix the kaolin with a combination of these or with magnesium chloride and magnesium nitrate in solution with water and evaporate and calcine together. Temperature of calcining magnesium compounds and for preparation of magnesium oxychloride cement powder is a matter known in science and chemistry. The preparation of magnesium oxychloride cement powder from magnesium chloride as formerly used with magnesium chloride saturated aqueous solution used as a setting medium, has been a matter of dental use for surely more than thirty-two years. However, the magnesium chloride can be readily calcined into the oxychloride cement powder at a temperature between three hundred and fifty and five hundred degrees centigrade. The resulting mass is then ground into powder. In this way the kaolin is coated with adherent magnesium oxide or oxychloride or a combination of them. The powder when mixed with guaiacol or eugenol or other suitable combining germicidal compound having setting reaction with the magnesium compound, forms a cement of much hardness and suitable setting rapidity, soon hard. Both eugenol and guaiacol are bactericidal and permissible to use as giving with the powder hard firm cements.

When the words, "solubility" or "insolubility" or "insoluble" occur in this specification or in the claims of this specification which follow, the meaning is solubility or insolubility in reference to water.

To obtain good, suitable proportions for good hardened cements, merely mixing together the cement powder and liquid or eugenol according to observation of consistency as above disclosed is sufficient. Exact weighed or measured proportions are not required when using eugenol or guaiacol as may be an old requirement with magnesium chloride setting fluid. Exact proportions are not essential for excellent cements but one part eugenol or setting liquid to one or two parts cement powder will be found the usual range of proportions for the working consistency.

The proportion of inert substance to use in the cement powder is a matter of choice in being a function of the neutralizing power of MgO or the magnesium cement binding ingredient of the powder as above disclosed and easily determined without experiment, and in limitation, according to the coarseness and the kind of the powder may be arrived at as a simple approximate matter of volume of the intersticial spaces of the inert or insoluble powder. When using kaolin alone sixty-five parts kaolin may be used with thirty-five parts MgO or magnesium oxychloride or magnesium cementitious matrial for very good cements,—or if the materials are calcined together a corresponding proportion of magnesium salt to produce the desired amount of MgO or cementitious binding ingredient is a simple matter of calculation by molecular weights. Any less amount of inert insoluble ingredients is of course permissible and on the other hand good cements may be obtained with somewhat less MgO present especially if the materials are calcined.

I claim:

1. A dental cement comprising magnesium oxide and eugenol as a setting liquid having setting reaction with the cement powder to harden with it.

2. A dental cement comprising a cement powder comprising magnesium oxide with which is incorporated a powder suitable for dental uses, chemically inert as to the cementitious ingredients of the cement, and eugenol as a setting liquid having setting reaction with the cement powder to harden with it.

3. A dental cement comprising kaolin, magnesium oxide and eugenol.

Signed at Boyett in the county of Attala and State of Mississippi June 16th, 1924.

PAUL W. KRUGER.